(12) United States Patent
DiCarlo et al.

(10) Patent No.: US 7,394,541 B1
(45) Date of Patent: Jul. 1, 2008

(54) AMBIENT LIGHT ANALYSIS METHODS, IMAGING DEVICES, AND ARTICLES OF MANUFACTURE

(75) Inventors: Jeffrey M. DiCarlo, Menlo Park, CA (US); Casey L. Miller, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 11/444,937

(22) Filed: May 31, 2006

(51) Int. Cl.
*G01J 3/51* (2006.01)

(52) U.S. Cl. .............................. 356/416; 250/214 AL; 356/419

(58) Field of Classification Search ................ 356/416, 356/419; 250/214 AL
See application file for complete search history.

(56) References Cited

U.S. PATENT DOCUMENTS

| | | | |
|---|---|---|---|
| 5,548,398 A | 8/1996 | Gaboury | |
| 6,069,972 A | 5/2000 | Durg et al. | |
| 6,597,451 B1 | 7/2003 | Araki | |
| 6,839,088 B2 | 1/2005 | Dicarlo et al. | |
| 2002/0159066 A1 | 10/2002 | Berstis | |
| 2002/0171842 A1 | 11/2002 | Dicarlo et al. | |
| 2004/0095561 A1 | 5/2004 | McDowell | |
| 2004/0105264 A1 | 6/2004 | Spero | |
| 2005/0083293 A1 | 4/2005 | Dixon | |
| 2005/0219364 A1 | 10/2005 | Dicarlo et al. | |

OTHER PUBLICATIONS

U.S. Appl. No. 11/054,193, filed Feb. 28, 2005; "Imaging Device, Analysis Methods, Imaging Device Analysis Systems, and Articles of Manufacture"; DiCarlo et al.

"Image Data Processing Methods, Image Data Processing Systems, And Articles Of Manufacture"; DiCarlo et al.; filed concurrently.

*Primary Examiner*—F. L Evans

(57) ABSTRACT

Ambient light analysis methods, imaging devices, and articles of manufacture are described. According to one aspect, an ambient light analysis method includes emitting light using a source, first filtering the light of the source providing first filtered light, first receiving the first filtered light using an imaging device, providing a first response of the imaging device to the first filtered light, second filtering ambient light providing second filtered light, second receiving the second filtered light using the imaging device, providing a second response of the imaging device to the second filtered light, and determining information regarding a spectral power distribution of the ambient light using the first response and the second response.

20 Claims, 3 Drawing Sheets

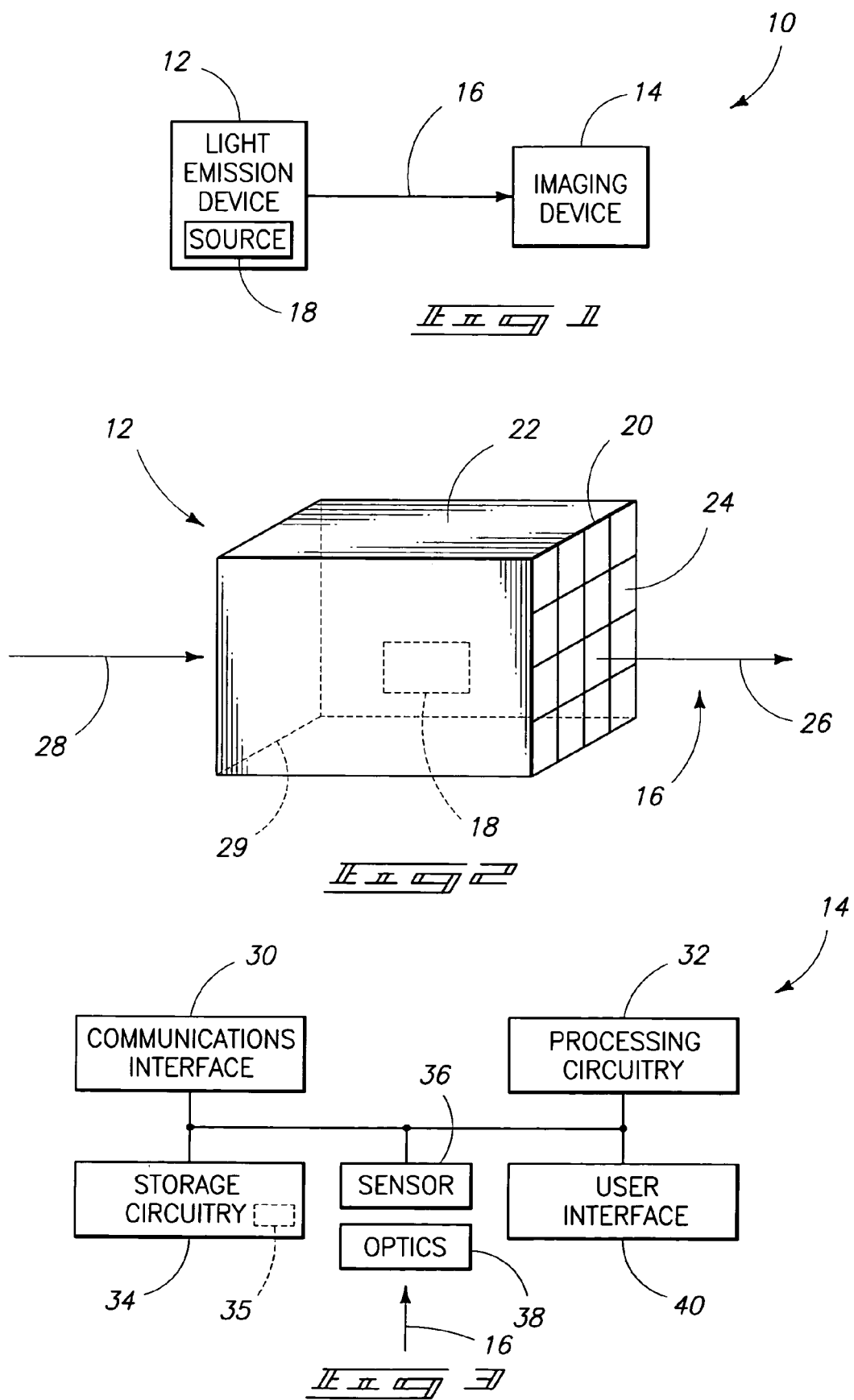

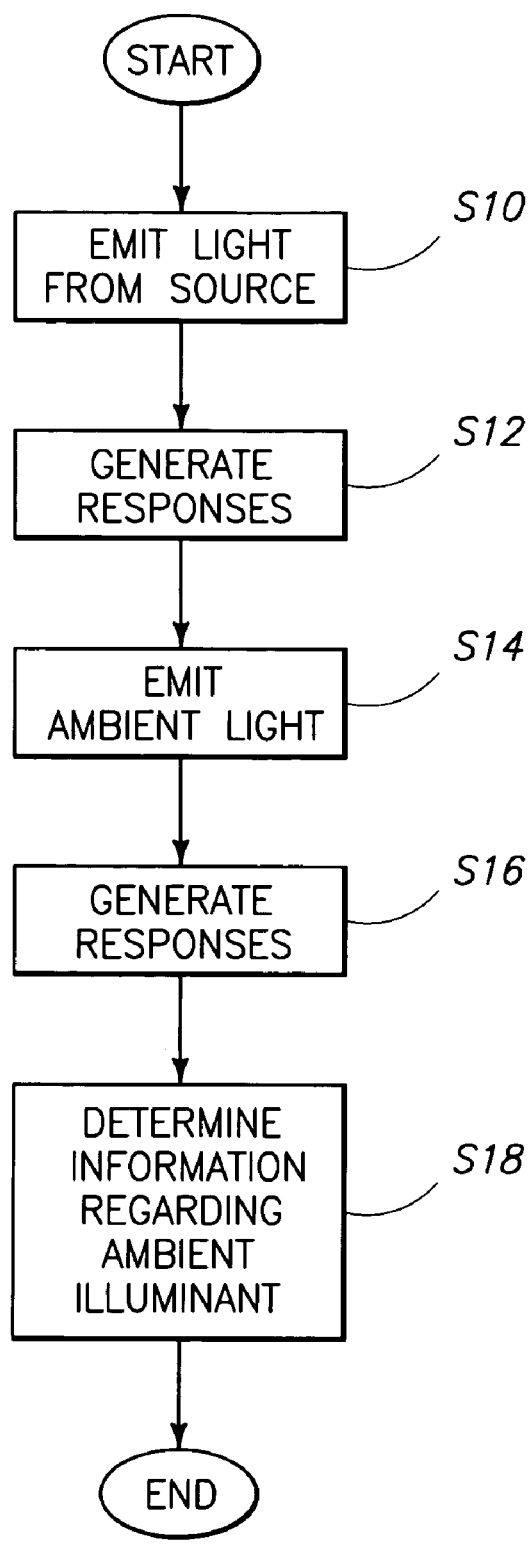

AMBIENT LIGHT ANALYSIS METHODS, IMAGING DEVICES, AND ARTICLES OF MANUFACTURE

FIELD OF THE DISCLOSURE

Aspects of the disclosure relate to ambient light analysis methods, imaging devices, and articles of manufacture.

BACKGROUND

The quality, sophistication and features of imaging devices and image reproduction systems have continued to evolve and improve. The more recent popularity of digital images and digital cameras has lead to significant improvements in digital imaging systems and techniques.

Following capture of images digitally or on film, some imaging devices or systems may process the images in an attempt to improve reproductions of the images. Processing of image data following capture may be implemented for example to provide image reproduction which produces images which more closely resemble original scenes. One example of processing which may be used or performed is color balancing which attempts to adjust colors of images to correct for distortions in color appearance resulting from acquisition under a different illuminant than that used for rendering the image.

Some systems use illuminant estimation algorithms to perform color balancing. Although an estimation of illuminant may provide some improvement in the results, some of the techniques estimate an ambient illuminant using collected light. In other systems, the spectral power distribution of ambient light is determined using a spectroradiometer and a white card at the location of the scene wherein images are to be captured.

At least some aspects of the disclosure provide improved apparatus and methods for processing image data for reproducing images.

SUMMARY

According to some aspects, exemplary ambient light analysis methods, imaging devices, light emission devices, ambient light analysis systems, and articles of manufacture are described.

According to one embodiment, an ambient light analysis method comprises emitting light using a source, first filtering the light of the source providing first filtered light, first receiving the first filtered light using an imaging device, providing a first response of the imaging device to the first filtered light, second filtering ambient light providing second filtered light, second receiving the second filtered light using the imaging device, providing a second response of the imaging device to the second filtered light, and determining information regarding a spectral power distribution of the ambient light using the first response and the second response.

According to another embodiment, an imaging device comprises an image generator configured to generate first and second responses of the imaging device responsive to respective ones of first emitted light from a source and second emitted light comprising ambient light, and processing circuitry coupled with the image generator and configured to access the first and second responses, to access information regarding a spectral power distribution of the first emitted light, and to provide information regarding a spectral power distribution of the second emitted light using the first and second responses and the information regarding the spectral power distribution of the first emitted light.

Other aspects are described as is apparent from the following disclosure.

DESCRIPTION OF THE DRAWINGS

FIG. 1 is a functional block diagram of an imaging system according to one embodiment.

FIG. 2 is an illustrative representation of a light emission device according to one embodiment.

FIG. 3 is a functional block diagram of an imaging device according to one embodiment.

FIG. 4 is a flow chart illustrating a method performed by an imaging system according to one embodiment.

DETAILED DESCRIPTION

Figure 5:
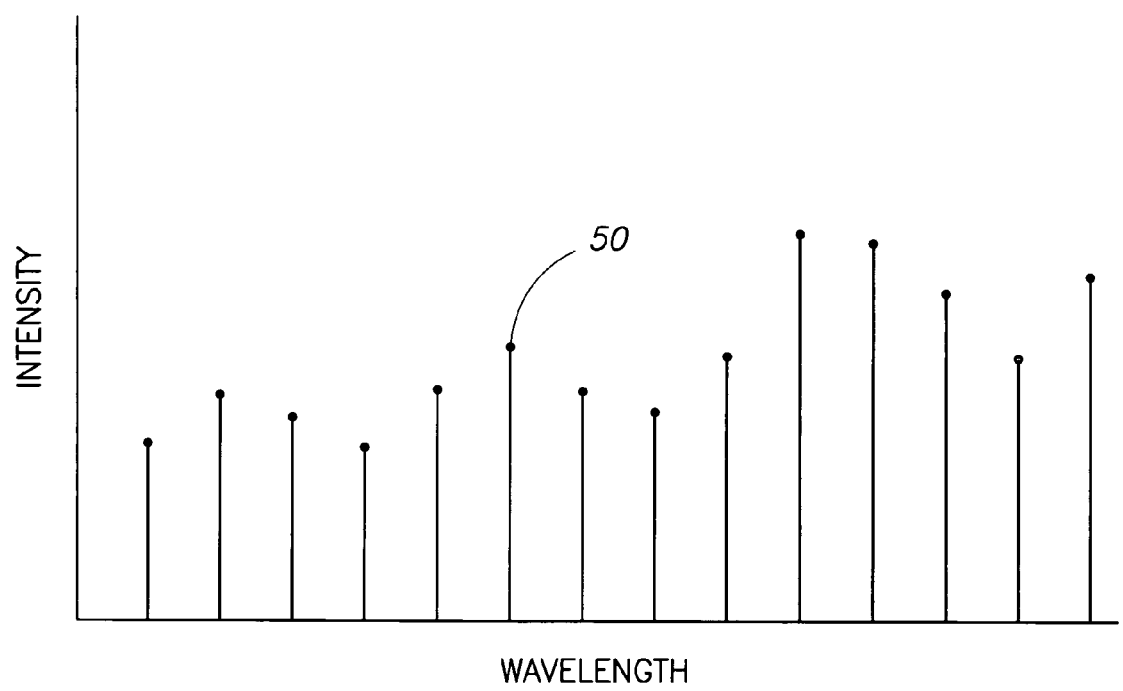
FIG. 5 is a graphical representation of a spectral power distribution of ambient light according to one embodiment.

The reader is directed to a co-pending U.S. patent application entitled "Image Data Processing Methods, Image Data Processing Systems, And Articles Of Manufacture" having Ser. No. 11/444,938, filed same day as the present application and the teachings of which are incorporated by reference herein.

At least some aspects of the disclosure are directed towards apparatus and methods for providing information regarding ambient light of scenes with respect to imaging operations. For example, in one embodiment, analysis is performed to provide information regarding an emission characteristic (e.g., spectral power distribution) of ambient light. The information may be utilized in one implementation to allow for proper white balancing and color balancing of the image data. For example, the information may be used to implement color or white balancing of an imaging device for a given scene or setting of use wherein images may be generated. Other aspects are disclosed below.

Referring to FIG. 1, an example of an imaging system is shown with respect to reference 10. Imaging system 10 includes a light emission device 12 and an imaging device 14 in the depicted embodiment. Imaging system 10 may include one or more additional devices (not shown), such as a personal computer, in other embodiments. For example, imaging system 10 may perform analysis operations of imaging device 14 using light emission device 12. In more specific examples, imaging system 10 may determine characteristics of imaging device 14 (e.g., responsivity functions, transduction functions, etc.), and/or characteristics of ambient light (e.g., spectral power distribution) as well as determine information usable by imaging device 14 during imaging operations (e.g., color correction matrix to implement color balancing). These or other exemplary analysis operations may be implemented using one or more of processing circuitry of light emission device 12, processing circuitry of another device, such as a personal computer or workstation of the system 10, and/or processing circuitry of imaging device 14.

Light emission device 12 may be arranged to emit light 16 which is received by imaging device 14 for implementing analysis operations. For example, in one implementation, light emission device 12 includes a light source 18 configured to generate light used for analysis operations. In addition, as described below, light emission device 12 may also be configured to emit light 16 resulting from ambient light in the presence of the imaging system 10.

In one embodiment, light emission device 12 may perform calibration operations with respect to imaging device 14 and may be referred to as an imaging device calibration instrument in at least one embodiment. Details of exemplary calibration operations using an imaging device calibration instrument are described in exemplary implementations in a co-pending U.S. patent application entitled "Imaging Device Calibration Methods, Imaging Device Calibration Instruments, Imaging Devices, And Articles Of Manufacture", having Ser. No. 10/818,622, filed Apr. 5, 2004, now U.S. Patent Publication No. 2005/0219364 A1, naming Jeffrey M. DiCarlo as inventor, and a co-pending U.S. patent application entitled "Imaging Device Analysis Methods, Imaging Device Analysis Systems, And Articles Of Manufacture", having Ser. No. 11/054,193, filed Feb. 8, 2005, naming Jeffrey M. DiCarlo and Casey Miller as inventors, and the teachings of both of which are incorporated herein by reference.

Imaging device 14 may be embodied as an appropriate device for reproducing images of scene. Accordingly, imaging device 14 may be implemented as a still camera (e.g., digital or film camera) or video camera in exemplary embodiments. Imaging device 14 may be used with light emission device 12 to provide information regarding an ambient illuminant in one embodiment as mentioned above. In addition, imaging device 14 may be calibrated using the information to provide images of increased accuracy with respect to an original scene and the ambient light associated therewith in one embodiment as described further below.

Referring to FIG. 2, details of light emission device 12 arranged according to an exemplary embodiment are shown. Light emission device 12 may additionally include source 18, an emission interface 20 and a housing 22 in one arrangement. Although not shown in FIG. 2, light emission device 12 may additionally include a communications interface, storage circuitry, processing circuitry and/or other electronic components which may be configured similarly to the exemplary components of imaging device 14 described below with respect to FIG. 3. Processing circuitry of light emission device 12 may be configured to control operations of device 12, such as the emission of light 16, and interface with imaging device 14. For example, processing circuitry of light emission device 12 may issue commands to control operations of imaging device 14, receive and process commands and/or data from imaging device 14, perform calculations responsive to received data and/or perform other operations.

Source 18 may comprise a broadband source configured to emit broadband light of a plurality different wavelengths across substantially an entirety of the visible spectrum in at least one embodiment. Information regarding a characteristic or property of source 18 and/or a plurality of narrowband light beams discussed below may be known and stored for example in storage circuitry of light emission device 12. Exemplary information may include a spectral power distribution of light generated by source 18 and/or the narrowband light beams.

Source 18 may be controlled to selectively provide the emitted light 16 for analysis and/or calibration operations (e.g., with respect to imaging device 14, the ambient illuminant of a scene, etc.). For example, at one moment in time, source 18 is controlled to emit light which results in the emission of light 16 from device 12. At another moment in time, source 18 may be turned off and light from another source (e.g., ambient light from an ambient illuminant) may provide emitted light 16 from device 12. Additional details regarding analysis and calibration operations are described below.

Emission interface 20 is configured to emit light 16 which may be received by imaging device 14 (not shown in FIG. 2). As described in detail below, emission interface 20 may comprise a plurality of regions 24 configured to emit (e.g., pass) a set of narrowband light beams 26 (only one beam 24 is labeled in FIG. 2). An example of a narrowband light beam 26 may have a substantially single peak wavelength and lower intensity light on either side of the peak wavelength (e.g., degrading approximately 25 nm on either side of the peak wavelength similar to a Gaussian distribution) in one embodiment. In but one implementation, regions 24 may include a plurality of filters configured to filter some wavelengths of light. Individual ones of the filters may filter light at different wavelengths and accordingly pass different respective peak wavelengths of light. In such an embodiment, at least some of narrowband light beams 26 may have different peak wavelengths.

Spectral power distribution information of the narrowband light beams 26 may be stored in appropriate storage circuitry or otherwise made available for operations described below. In one implementation, transmittance functions of regions 24 may be multiplied by a spectral power distribution of source 18 to provide the spectral power distributions of the narrowband light beams 26 resulting from light of source 18. In another aspect, the spectral power distributions of the narrowband light beams 26 may be measured for example using a spectroradiometer with source 18 on.

In one embodiment, emission interface 20 may include sixteen filters for regions 24 and individually configured to pass different wavelengths of light. The filters 24 may be configured to pass light providing a substantially even distribution of peak wavelengths in one arrangement. For example, emission interface 20 may comprise the filters configured to pass peak wavelengths sequentially increasing in wavelength at increments of 25 nm from ultraviolet light (375 nm) to infrared light (725 nm) providing light 26 which is spectrally and spatially separated in one exemplary embodiment. A single filter may be substantially transparent and pass all wavelengths of light in the exemplary embodiment. Other arrangements are possible including more or less filters to provide more or less narrowband light beams 26 and/or narrowband light beams 26 of different wavelengths. In addition, other configurations than filters may be used to generate narrowband light beams 26 for regions 24 in other embodiments.

At some moments in time, emission interface 20 passes light emitted from source 18 to provide the narrowband light beams 26. At other moments in time, light emission device 12 is arranged to pass ambient light 28 for analysis and/or calibration operations. For example, source 18 may be turned off and a door 29 of housing 22 may be opened at a surface opposite to emission interface 20 in one embodiment to permit the entry of ambient light 28 in the presence of the imaging system 10 into housing 22. Filters of regions 24 of emission interface 20 may filter the ambient light 28 as described above to provide another set of narrowband light beams 26 which only result from the ambient light 28 in the described embodiment (e.g., source 18 is off). At moments in time when source 18 is illuminated, door 29 may be closed to seal the housing 22 to prevent the entry of ambient light 28 into housing 22.

Housing 22 may be configured as a guide to direct light therein (e.g., generated by source 18 or ambient light 28) to emission interface 20. Housing 22 may incorporate a diffuser and/or randomizer to provide substantially uniform light to interface 20 in some embodiments. Additional details regarding exemplary configurations of light emission device 12 are described in the above-mentioned patent applications. Other configurations are possible in other embodiments.

According to one embodiment, light emission device 12 and imaging device 14 are optically coupled during analysis operations in an arrangement wherein substantially the only light received by imaging device 14 is emitted (e.g., passes through) emission interface 20. For example, a bellows (not shown) may be provided about emission interface 20 for optical coupling with a lens of imaging device 14 or other structure may be used wherein the only light received by the lens is emitted from the emission interface 20. Other configurations are possible.

Referring to FIG. 3, imaging device 14 is illustrated in an exemplary configuration as a digital camera. Imaging device 14 in the illustrated digital camera configuration includes a communications interface 30, processing circuitry 32, storage circuitry 34, an image sensor 36, optics 38, and a user interface 40. As mentioned previously, imaging device 14 may be embodied in other configurations (e.g., film) to generate images from scenes or received light. Sensor 36 may be referred to as an image generator in a digital configuration of imaging device 14. In a film configuration of imaging device 14, the image generator may comprise the film.

Communications interface 30 is configured to establish communications of imaging device 14 with respect to external devices (e.g., light emission device 12). Exemplary configurations of communications interface 30 include a USB port, serial or parallel connection, IR interface, wireless interface, or any other arrangement capable of uni or bi-directional communications. Communications interface 30 may be configured to couple with and exchange any appropriate data with light emission device 12 or other external device. For example, communications interface 30 may be utilized to receive one or more emission characteristic (e.g., spectral power distributions) of emitted light 16 resulting from source 18 and/or an ambient illuminant 28, one or more characteristic and/or information of the respective imaging device 14 (e.g., responsivity function, transduction function, color correction matrices, etc.). Further, interface 30 may output data for communication to external devices such as light emission device 12. Exemplary outputted data may include image data generated by image sensor 36 responsive to received light 16, commands to control operations of light emission device 12 (e.g., timing of emission of light 16) and other data which may be used to assist with determination of characteristics of imaging device 14 and/or the ambient illuminant.

In one embodiment, processing circuitry 32 may comprise circuitry configured to implement desired programming. For example, processing circuitry 32 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 32 are for illustration and other configurations are possible.

Processing circuitry 32 may be utilized to control operations of imaging device 14 (e.g., image capture operations, control optics, etc.) as well as light emission device 12 or other external devices. In addition, processing circuitry 32 may process captured image data to determine characteristics of imaging device 14, determine characteristics of the ambient or scene illuminant, or control outputting of image data to external devices including light emission device 12. Other embodiments of processing circuitry 32 may include different and/or additional hardware.

Storage circuitry 34 is configured to store electronic data (e.g., image data, determined characteristics of imaging device 14, determined characteristics of an ambient illuminant, color correction matrices, etc.) and/or programming such as executable instructions (e.g., software and/or firmware), or other digital information. Storage circuitry 34 may comprise processor-usable media which may include an article of manufacture 35 which can contain, store, or maintain programming, data and/or digital information for use by or in connection with an instruction execution system including processing circuitry 32 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing-programming, data, or other digital information.

Image sensor 36 is configured to provide image data of a plurality of images. For example, the image data may comprise bytes corresponding to the colors of red, green and blue at respective pixels of sensor 36 in an exemplary RGB application (e.g., using a Bayer mosaic filtering pattern to provide respective pixels for red, green and blue information). Other embodiments may provide other color information. Image sensor 36 may comprise a plurality of photosensitive elements, such as photodiodes, corresponding to the pixels and configured to provide digital data usable for generating images. For example, image sensor 36 may comprise a raster of photosensitive elements (also referred to as pixel elements) arranged in 1600 columns by 1280 rows in one possible configuration. Other raster configurations are possible. The photosensitive elements may comprise charge coupled devices (CCDs) or CMOS devices in exemplary configurations.

Optics 38 may include one or more appropriate lens and an aperture configured to focus and direct received light 16 to image sensor 36 for creation of image data using image sensor 36. Appropriate motors (not shown) may be controlled by processing circuitry 32 to implement desired manipulation of optics 38 in one embodiment.

User interface 40 is configured to interact with a user including conveying data to a user (e.g., displaying data for observation by the user, audibly communicating data to a user, etc.) as well as receiving inputs from the user (e.g., tactile input, etc.). Accordingly, in one exemplary embodiment, the user interface 40 may include a display (e.g., LCD, etc.) configured to depict visual information and a tactile input device. Any other suitable apparatus for interacting with a user may also be utilized. A user may utilize user interface 40 to initiate and implement analysis and/or calibration operations with respect to imaging device 14 in one example.

Referring to FIG. 4, a flow chart is depicted of exemplary analysis operations performed by imaging system 10 according to one embodiment. The steps of the illustrated flow chart may be implemented using light emission device 12 and imaging device 14 in one arrangement. In another arrangement, an external device, such as a personal computer, may be used to implement one or more of the steps. Any appropriate apparatus may be utilized. Additionally, other methods may be performed by imaging system 10 including more, less or alternative steps in other embodiments.

Initially, at a step S10, the light emission device may be controlled to emit light originating from a source of the light emission device. The imaging device being analyzed and the light emission device may be arranged in a configuration such that the optics of the imaging device only receive light emitted from the source of the light emission device during step S10. The light emitted from the light emission device may include a set of spatially separated narrowband light beams of different wavelengths according to the above-described exemplary embodiment. The light emitted at step S10 may be referred to as first emitted light (or first filtered light if filtering is performed by the light emission device).

At a step S12, the imaging device receives the light emitted in step S10 and generates one or more responses to the received light. In one embodiment, the imaging device generates a response for each of the narrowband light beams received from the light emission device. For example, in one embodiment, the narrowband light beams are spatially separated from one another corresponding to the regions of the emission interface shown in the exemplary configuration of FIG. 2. Accordingly, different areas of the image sensor of the imaging device may be considered to correspond to and receive light from the different spatially located regions of the emission interface shown in FIG. 2. Image data provided at pixel locations of the respective areas of the sensor may comprise or be utilized to generate respective responses to the respective narrowband light beams.

In another embodiment, the emission interface of the light emission device may emit individual ones of the narrowband light beams across substantially an entirety of the surface of the interface at different moments in time. The image data for the respective narrowband light beams may be generated at different moments in time by all of the pixel locations of the sensor of the imaging device in one implementation of this alternative embodiment.

In one response determination method for an individual narrowband light beam, appropriate processing circuitry may access image data from the appropriate pixel locations of the image sensor. In one embodiment, the processing circuitry may average the image data (e.g., intensity values) for respective ones of the colors. For example, using pixels corresponding to the spatial region of interest (i.e., corresponding to light received by an individual one of the narrowband light beams), the processing circuitry may determine average intensity values for each of red, green and blue using respective ones of the red, green and blue pixels of the region of interest of the sensor in an exemplary RGB implementation. Thereafter, the processing circuitry may compare the red, green, and blue average intensity values with one another and select the one having the greatest magnitude as the response of the imaging device to the respective narrowband light beam. In addition, the processing circuitry may also store information indicative of, for each of the narrowband light beams, which color (red, green or blue) was used to provide the average intensity value as the response for the respective narrowband light beam. For example, as discussed further below, the stored information may be used in step S16.

Additionally, at step S12, the imaging device may be calibrated if not already performed. For example, using techniques discussed in the above-incorporated patent applications, the responsivity and transduction functions of the imaging device may be determined.

At a step S14, the light emission device is reconfigured for additional analysis operations. For example, the light source of the light emission device illuminated during step S10 may be turned off and the housing may be configured to permit ambient light to pass through the light emission device in the described configuration. At step S14, the light emission device emits a set of narrowband light beams responsive to the ambient light for additional processing. The light emitted at step S14 may be referred to as second emitted light (or second filtered light if filtering is performed by the light emission device).

At a step S16, the appropriate processing circuitry may determine the responses of the imaging device. In one configuration, the processing circuitry generates the responses in a manner similar to the procedure discussed with respect to step S12. More specifically, the processing circuitry may access the information indicative of the colors (e.g., red, green or blue) used to generate the responses of the imaging device for individual ones of the narrowband light beams. Instead of comparing the responses of the different colors as described above, the processing circuitry may determine average values of the respective colors which were used to provide the responses for the respective narrowband light beams during the analysis of step S12. For example, for a selected one of the narrowband light beams (e.g., 525 nm), red may be used in step S16 to provide the response (e.g., average intensity) for the respective narrowband light beam if red was used for the same narrowband light beam in step S12. The processing circuitry may determine the corresponding response values for each of the narrowband light beams to provide the response of the imaging device to the ambient light.

At a step S18, the processing circuitry may utilize the responses from steps S12 and S18 to determine information (e.g., spectral power distribution) regarding the ambient light. In one configuration, the processing circuitry may, for an individual narrowband light beam (i.e., individual peak wavelength), generate a ratio of the respective responses of the imaging device to ambient light and the light of the source of the light emission device. The ratio may be multiplied by the respective spectral power distribution of light of the respective narrowband light beam with the light source on to generate an intensity value of the spectral power distribution of the ambient light at the wavelength corresponding to the peak wavelength of the respective narrowband light beam.

For example, the formula $L_n^A = L_n^I (R_n^A / R_n^I)$ may be used for a given narrowband light beam n wherein $R_n^I$ is the response of the imaging device to the nth narrowband light beam with the light source of the light emission device ON, $R^A$ is the response of the imaging device to the nth narrowband light beam with ambient light emitted from the light emission device and the light source OFF, and $L_n^I$ is the spectral power distribution of light of the nth narrowband light beam with the light source of the light emission device ON (e.g., $L_A^I$ may be an intensity value of the respective narrowband light beam at the respective peak wavelength of the narrowband light beam). Calculation of the formula provides $L_n^A$ which provides an intensity value of the spectral power distribution of the ambient light or illuminant at the respective peak wavelength of the nth narrowband light beam. According to at least the above-described embodiment wherein the regions are configured to emit the narrowband light beams substantially evenly distributed across the visible spectrum, the calculation may be repeated for each of the peak wavelengths of the narrowband light beams to construct an approximation of the entire spectral power distribution of the ambient light.

Referring to FIG. 5, an exemplary graph of the approximate spectral power distribution for the ambient light resulting from the analysis of FIG. 4 is shown. A plurality of plotted points 50 correspond to intensity values determined by the above-recited exemplary equation according to one embodiment. More specifically, the peak wavelengths of the narrowband light beams are plotted along the x-axis of FIG. 5 and the calculated intensity values for the respective peak wavelengths of the narrowband light beams determined using the above-recited equation are plotted against the y-axis. The resulting plotted points may be used to approximate the spectral power distribution of the ambient light.

In one embodiment, additional points may be plotted by interpolating the data between the measured wavelengths using linear interpolation or any other suitable form of interpolation.

Once the spectral power distribution of the ambient light is determined, it may be used to configure the imaging device 14 for processing image data generated in the presence of the ambient light to provide images of increased reproduction accuracy. For example, in one embodiment, the spectral power distribution of the ambient light may be used to determine information usable for processing of images captured in the presence of the ambient light (e.g., a color correction matrix usable for processing of image data captured in the presence of the ambient light may be determined).

An image formation equation may be represented in matrix notation as $C^L = R^T \text{diag}(e)S$ wherein S is a database known of surface reflectance functions, e is the spectral power distribution of the ambient light, for example, as determined above, R are the responsivity functions of the imaging device 14 which may be calculated in one implementation using teachings described in the above recited patent applications, and $C^L$ includes the linear responses of imaging device 14. The pseudoinverse of the determined linear response ($\text{pinv}(C^L)$) may correspond to a color correction matrix usable to process image data obtained by imaging device 14 in the presence of the respective ambient light in one embodiment.

The protection sought is not to be limited to the disclosed embodiments, which are given by way of example only, but instead is to be limited only by the scope of the appended claims.

What is claimed is:

1. An ambient light analysis method comprising:
   emitting light using a source;
   first filtering the light of the source providing first filtered light;
   first receiving the first filtered light using an imaging device;
   providing a first response of the imaging device to the first filtered light;
   second filtering ambient light providing second filtered light;
   second receiving the second filtered light using the imaging device;
   providing a second response of the imaging device to the second filtered light; and
   determining information regarding a spectral power distribution of the ambient light using the first response and the second response.

2. The method of claim 1 wherein the determining comprises determining using information of a spectral power distribution of the first filtered light.

3. The method of claim 2 wherein the determining comprises combining the information of the spectral power distribution of the first filtered light with a ratio of the first and second responses.

4. The method of claim 2 wherein the spectral power distribution of the first filtered light and the ambient light individually comprise a plurality of intensity values at a plurality of different wavelengths, and wherein the determining comprises determining, for an individual one of the wavelengths, using a ratio of the first and second responses at the individual one of the wavelengths and the intensity value of the spectral power distribution of the first filtered light at the individual one of the wavelengths to provide the intensity value of the spectral power distribution of the ambient light at the individual one of the wavelengths.

5. The method of claim 1 wherein the first and second filtering comprise filtering to provide the first filtered light and the second filtered light individually comprising a narrowband light beam comprising substantially a single peak wavelength, and wherein the determining comprises determining the information of the spectral power distribution of the ambient light at the single peak wavelength.

6. The method of claim 1 wherein the first and second filtering comprise filtering to provide the first filtered light and the second filtered light individually comprising a plurality of narrowband light beams of a plurality of different wavelengths, and wherein the determining comprises determining the information of the spectral power distribution of the ambient light at the different wavelengths.

7. The method of claim 6 wherein the determining, for an individual one of the different wavelengths, comprises multiplying spectral power distribution information of the first filtered light at the individual one of the different wavelengths by a ratio of the first and second responses individually corresponding to the individual one of the different wavelengths.

8. The method of claim 1 wherein the first and second receivings individually comprise receiving using the imaging device comprising a camera.

9. The method of claim 1 wherein the emitting comprises emitting the light comprising broadband light using the source comprising a broadband light source.

10. The method of claim 1 further comprising determining information usable for processing image data obtained in the presence of the ambient light.

11. An imaging device comprising:
    an image generator configured to generate first and second responses of the imaging device responsive to respective ones of first emitted light from a source and second emitted light comprising ambient light; and
    processing circuitry coupled with the image generator and configured to access the first and second responses, to access information regarding a spectral power distribution of the first emitted light, and to provide information regarding a spectral power distribution of the second emitted light using the first and second responses and the information regarding the spectral power distribution of the first emitted light.

12. The device of claim 11 wherein the processing circuitry is configured to utilize the information regarding the spectral power distribution of the second emitted light to generate information usable for processing image data obtained in the presence of the ambient light.

13. The device of claim 12 wherein the processing circuitry is configured to generate the information comprising color correction information.

14. The device of claim 11 wherein the spectral power distribution of the first emitted light and the second emitted light individually comprise a plurality of intensity values at a plurality of different wavelengths, and wherein the processing circuitry is configured, for an individual one of the wavelengths, to utilize a ratio of the first and second responses at the individual one of the wavelengths and the intensity value of the spectral power distribution of the first emitted light at the individual one of the wavelengths to provide the intensity value of the spectral power distribution of the second emitted light at the individual one of the wavelengths.

15. The device of claim 11 wherein the image generator comprises a sensor configured to generate the first and second responses individually comprising digital information.

16. An article of manufacture comprising:
    media comprising programming configured to cause processing circuitry to perform processing comprising:

accessing a first response provided by an imaging device responsive to light emitted by a source;

accessing a second response provided by the imaging device responsive to ambient light in the presence of the imaging device;

accessing information regarding a spectral power distribution of the light emitted by the source; and determining information regarding a spectral power distribution of the ambient light using the first and second responses and the information regarding the spectral power distribution of the light emitted by the source.

17. The article of claim 16 wherein the media comprises programming configured to cause processing circuitry to perform processing comprising determining the first and second responses.

18. The article of claim 16 wherein the media comprises programming configured to cause processing circuitry to perform processing comprising generating information useable for processing image data obtained in the presence of the ambient light using the information regarding the spectral power distribution of the ambient light.

19. The article of claim 16 wherein the spectral power distribution individually comprise a plurality of intensity values at a plurality of wavelengths, and wherein the media comprises programming configured to cause processing circuitry to perform processing comprising, for an individual one of the wavelengths, multiplying the intensity value of the spectral power distribution of the light emitted by the source corresponding to the individual one of the wavelengths by a ratio of the first and second responses at the individual one of the wavelengths.

20. The article of claim 16 wherein the media comprises media of a digital camera.

* * * * *

UNITED STATES PATENT AND TRADEMARK OFFICE
CERTIFICATE OF CORRECTION

PATENT NO.         : 7,394,541 B1  
APPLICATION NO. : 11/444937  
DATED              : July 1, 2008  
INVENTOR(S)       : Jeffrey M. DiCarlo et al.

Page 1 of 1

It is certified that error appears in the above-identified patent and that said Letters Patent is hereby corrected as shown below:

In column 8, line 38, delete "$R^{nA}$" and insert -- $R_n^A$ --, therefor.

Signed and Sealed this

Fifth Day of May, 2009

JOHN DOLL  
*Acting Director of the United States Patent and Trademark Office*